United States Patent
Schanlaub et al.

(10) Patent No.: US 11,642,691 B2
(45) Date of Patent: May 9, 2023

(54) AUTOMATIC PIPE DOPING APPARATUS

(71) Applicant: Nabors Drilling Technologies USA, Inc., Houston, TX (US)

(72) Inventors: Ronald Schanlaub, Houston, TX (US); Keith Hager, Spring, TX (US); Chris Magnuson, Houston, TX (US); Eric Deutsch, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 272 days.

(21) Appl. No.: 17/197,597

(22) Filed: Mar. 10, 2021

(65) Prior Publication Data

US 2021/0187540 A1 Jun. 24, 2021

Related U.S. Application Data

(62) Division of application No. 16/175,259, filed on Oct. 30, 2018, now Pat. No. 10,974,272.

(Continued)

(51) Int. Cl.
| | |
|---|---|
| *B05C 3/20* | (2006.01) |
| *E21B 19/00* | (2006.01) |
| *F16N 7/00* | (2006.01) |
| *B05C 11/08* | (2006.01) |
| *B05C 9/12* | (2006.01) |

(Continued)

(52) U.S. Cl.
CPC ............... *B05C 3/20* (2013.01); *B05C 9/12* (2013.01); *B05C 11/06* (2013.01); *B05C 11/08* (2013.01); *B05D 1/02* (2013.01); *B05D 1/28* (2013.01); *B05D 3/002* (2013.01); *B05D 3/0413* (2013.01); *E21B 19/00* (2013.01); *F16N 7/00* (2013.01); *Y10S 118/11* (2013.01)

(58) Field of Classification Search
CPC ......... B05D 1/02; B05D 3/002; B05D 3/0413
See application file for complete search history.

(56) References Cited

U.S. PATENT DOCUMENTS

| | | |
|---|---|---|
| 4,011,617 A | 3/1977 | Toelke et al. |
| 7,963,371 B2 * | 6/2011 | Belik ................ F16N 7/32 |
| | | 118/712 |

(Continued)

OTHER PUBLICATIONS

Office Action issued in Saudi Arabian App. No. 118400159, dated Sep. 1, 2021 with English translation (12 pages).

*Primary Examiner* — Nathan T Leong
(74) *Attorney, Agent, or Firm* — Ewing & Jones, PLLC

(57) ABSTRACT

A pipe doping apparatus comprises a bucket assembly including a base and a bucket supported on the base and having an inside volume, a lubricating unit having at least one lubricant applicator inside the bucket; and a source of torque configured to rotate the bucket and/or the lubricating unit relative to a tubular. The apparatus may include a cleaning unit and/or a drying unit and the source of torque may be a fluid jet in either. At least one lubricant applicator may be retractable and may be actuated between a retracted position and an extended position by centripetal force. The apparatus may further include a positioning assembly supporting the base and the rotary bucket assembly and a controller connected to and controlling each of:—the positioning assembly, the cleaning unit, the drying unit, and the lubricating unit.

5 Claims, 9 Drawing Sheets

Related U.S. Application Data

(60) Provisional application No. 62/581,246, filed on Nov. 3, 2017.

(51) Int. Cl.
  *B05C 11/06* (2006.01)
  *B05D 1/02* (2006.01)
  *B05D 1/28* (2006.01)
  *B05D 3/00* (2006.01)
  *B05D 3/04* (2006.01)

(56) References Cited

U.S. PATENT DOCUMENTS

| | | | | |
|---|---|---|---|---|
| 2004/0026080 A1* | 2/2004 | Reinholdt | ............ | E21B 17/006 |
| | | | | 166/77.51 |
| 2008/0223418 A1* | 9/2008 | Vatne | ............ | E21B 17/006 |
| | | | | 134/115 R |

* cited by examiner

AUTOMATIC PIPE DOPING APPARATUS

CROSS-REFERENCE TO RELATED APPLICATIONS

This application is a divisional application that claims priority to U.S. non-provisional application 16/175,259 that was filed Oct. 30, 2018, claims priority from U.S. provisional application No. 62/581,246, filed Nov. 3, 2017, which is incorporated by reference herein in its entirety.

TECHNICAL FIELD/FIELD OF THE DISCLOSURE

The present disclosure relates to the cleaning and application of lubricant to pin ends of tubular members.

BACKGROUND OF THE DISCLOSURE

The exploration and production of hydrocarbons requires the use of drilling systems that include tubulars such as drill pipes, casings, and other threadedly connected elements used in the well structures. Typically, a string of drill pipes coupled end-to-end and referred to as a drill string is used to form a wellbore. These tubulars are normally assembled in groups of two or more commonly known as "stands" to be vertically stored in the derrick or mast.

On a drilling rig, the drill string may be assembled in the derrick or mast. The drill string may be run downhole and into the wellbore. The drill string may be used to transmit rotational power to the drill bit located at the lower end of the drill string. The drill string may also be used to transmit drilling fluid, commonly known as mud, down through the internal bore in the drill string. The mud exits at or near the drill bit and then circulates back up the well annulus between the drill string and the well bore. The drill pipe string may also run casing, a liner, or a landing string downhole. The drill string may also be used for work-over activity of a hydrocarbon well.

The drill string is comprised of tubulars threaded and connected together by the threaded ends of each tubular. A joint or segment of a drill pipe may vary in length. A joint or segment of drill pipe is comprised of a female connection, known as the "box" and a male section known as the "pin". The box end is internally threaded and adapted to receive the pin end member of another drill pipe joint, which has external threads. A drill string is assembled by connecting the multiple joints and tightening each threaded connection to a predetermined torque value. Typically, power tongs or automated roughnecks are used to transmit sufficient torque to the pipe joints to ensure that the pin is securely tightened to the box. The amount of torque required to securely tighten the tubulars is known as make-up torque. Properly torqued connections are crucial to drill string integrity. Insufficient torque may result in failure of the threaded connection and excessive torque could stretch or burst the box member or crack or break the pin member.

A blend of lubricating grease and fine metallic particles known as "pipe dope" is typically applied to each threaded connection. Pipe dope has several functions, including maintaining a consistent coefficient of friction so that predictable preloads result from the make-up torque, preventing galling in rotary shouldered connections, promoting sealing between each pin and box, and protecting thread surfaces from corrosion.

Typically, rig personnel manually apply pipe dope to the threaded pipe connections on the rig floor. Manual pipe doping is performed using bristle or mop style brushes dipped into containers of lubricating compound on the rig floor, then manually applied to the pin end of the tubular. An automated rig floor precludes this manual method. Further, this operation may be time consuming and dangerous for the rig personnel.

SUMMARY

The present disclosure provides an apparatus and method for applying pipe dope to the pin or box end of a tubular. In some embodiments, a pipe doping apparatus consistent with this disclosure comprises a rotating bucket assembly including a base and a rotating bucket supported on the base and having an inside volume, a rotary actuator, the rotary actuator mechanically coupled to the rotating bucket, a cleaning unit, the cleaning unit including at least one high pressure cleaning fluid nozzle inside the bucket, a drying unit, including at least one gas outlet inside the bucket, and, a lubricating unit, the lubricating unit having at least one retractable lubricant applicator inside the bucket. The apparatus may also include various sensors, including but not limited to fluid level sensors, pressure sensors, position sensors, rotation sensors, proximity sensors, timers, and contact sensors, each of which may provide input to the controller.

In some embodiments, a pipe doping apparatus may comprise a bucket assembly including a base and a bucket supported on the base and having an inside volume, a cleaning unit having at least one cleaning fluid outlet inside the bucket, a drying unit having at least one gas outlet inside the bucket, a lubricating unit having at least one retractable applicator inside the bucket, and a source of torque configured to rotate at least one of the bucket, the cleaning unit, the drying unit, and the lubricating unit relative to the base.

In some embodiments, the source of torque may be a fluid jet in at least one of the cleaning unit and the drying unit. At least one lubricant applicator may be retractable and may be actuated between a retracted position and an extended position by centripetal force. In some embodiments, at least one of the applicators is extendable and retractable by active (pneumatic, hydraulic, electric) or passive (centripetal) means.

The pipe doping apparatus may further include a positioning assembly supporting the base and the rotary bucket assembly and a controller connected to and controlling each of: the positioning assembly, the cleaning unit, the drying unit, and the lubricating unit. In some embodiments, the pipe doping apparatus may further include a bucket rotation sensor and the bucket may include a drain. In some embodiments, the pipe doping apparatus may further include an additional lubricating unit mounted on one of the bucket, the base, or the positioning assembly and extendable so as to apply lubricant to a top drive pin.

The pipe doping apparatus may further include a cleaning fluid reservoir and pump in fluid communication with the high pressure cleaning fluid nozzle. The drying unit gas outlet may be an air knife, which may be in fluid communication with a blower or air compressor.

A lubricant reservoir and pump may be in fluid communication with the retractable lubricant applicator and the retractable lubricant applicator may comprise an applicator selected from the group consisting of spatula-type applicators, bristle brushes, mop brushes, foam brushes, and roller brushes. The retractable lubricant applicator may be coupled to a pneumatic actuator that may be adapted to move the retractable lubricant applicator from a retracted position to an extended position.

A method of applying lubrication to a pin end of a tubular in accordance with the present disclosure comprises a) providing a pipe doping apparatus, the pipe doping apparatus comprising a rotating bucket assembly, the rotating bucket assembly including a base and a bucket supported on the base and having an inside volume, a rotary actuator, the rotary actuator mechanically coupled to the rotating bucket, a cleaning unit, the cleaning unit including at least one high pressure cleaning fluid nozzle extending into the inside volume, a drying unit, including at least one gas outlet extending into the inside volume, and a lubricating unit, the lubricating unit having at least one retractable lubricant applicator in the inside volume, b) positioning the pin end of the tubular within the rotating bucket assembly, c) rotating the rotating bucket assembly, and d) removing the pin end of the tubular from the rotating bucket assembly. Step c) may comprise, while rotating the rotating bucket assembly, c1) cleaning the pin end of the tubular, for example by supplying fluid through one or more high pressure fluid nozzles, c2) drying the pin end of the tubular, for example by supplying gas through the dryer nozzles, and c3) lubricating the pin end of the tubular, for example by supplying pipe dope to the lubricant applicators.

The pipe doping apparatus may include a positioning assembly supporting the base and the rotary bucket assembly and step b) may comprise using the positioning assembly to move the rotary bucket assembly such that the pin end of the tubular is received in the bucket.

Step c3) may include advancing the retractable lubricant applicator toward the pin end of the tubular, contacting the pin end of the tubular with the retractable lubricant applicator, and retracting the retractable lubricant applicator away from the pin end of the tubular and step c2) may comprise directing air through an air knife to the pin end of a tubular.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Also, for the sake of clarity, portions of the assembly may be hidden from view or cut-away in certain figures.

DETAILED DESCRIPTION

Figure 1:
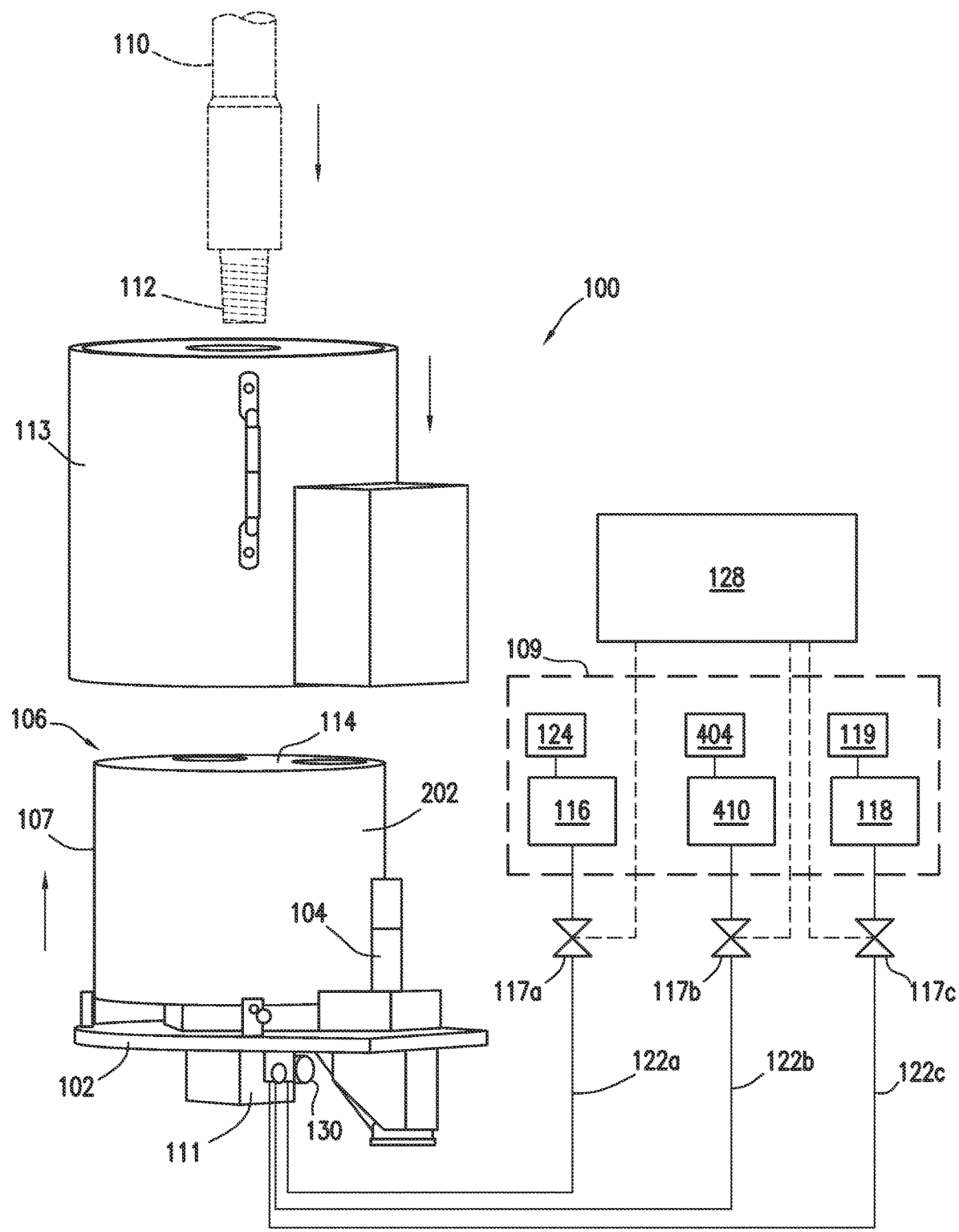
FIG. 1 is a partially exploded and partially schematic diagram of a pipe doping system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts pipe doping system 100 for applying pipe dope (lubricant) to one end of a tubular. Pipe doping system 100 may include a rotating bucket assembly 106 comprising a rotating bucket 107, a removable guard 113, and a base 102, a fluid supply system 109, an optional positioning assembly 600 (shown in FIG. 7), and a controller 128. Each is described in more detail below. When the system is in use, guard 113 fits over bucket 107 and rests on base 102. Bucket 107 and guard 113 are configured to receive therein the pin end 112 of a length of pipe 110 (shown in phantom).

As shown in FIG. 1, fluid supply system 109 may include a cleaning fluid reservoir 116 in fluid communication with a cleaning fluid pump 124, an drying gas reservoir 410 in fluid communication with drying gas pump 404, which may be an air pump or compressor, and a lubricant reservoir 118 in fluid communication with a lubricant pump 119. In some embodiments, fluid reservoir 116, drying gas reservoir 410, and lubricant reservoir 118 may be fluidly connected to rotating bucket assembly 106 through fluid supply lines 122a-c respectively, with flow therethrough controlled by valves 117a-c, respectively. In some embodiments, the relative positions of each reservoir and pump may be interchanged.

Figure 2:
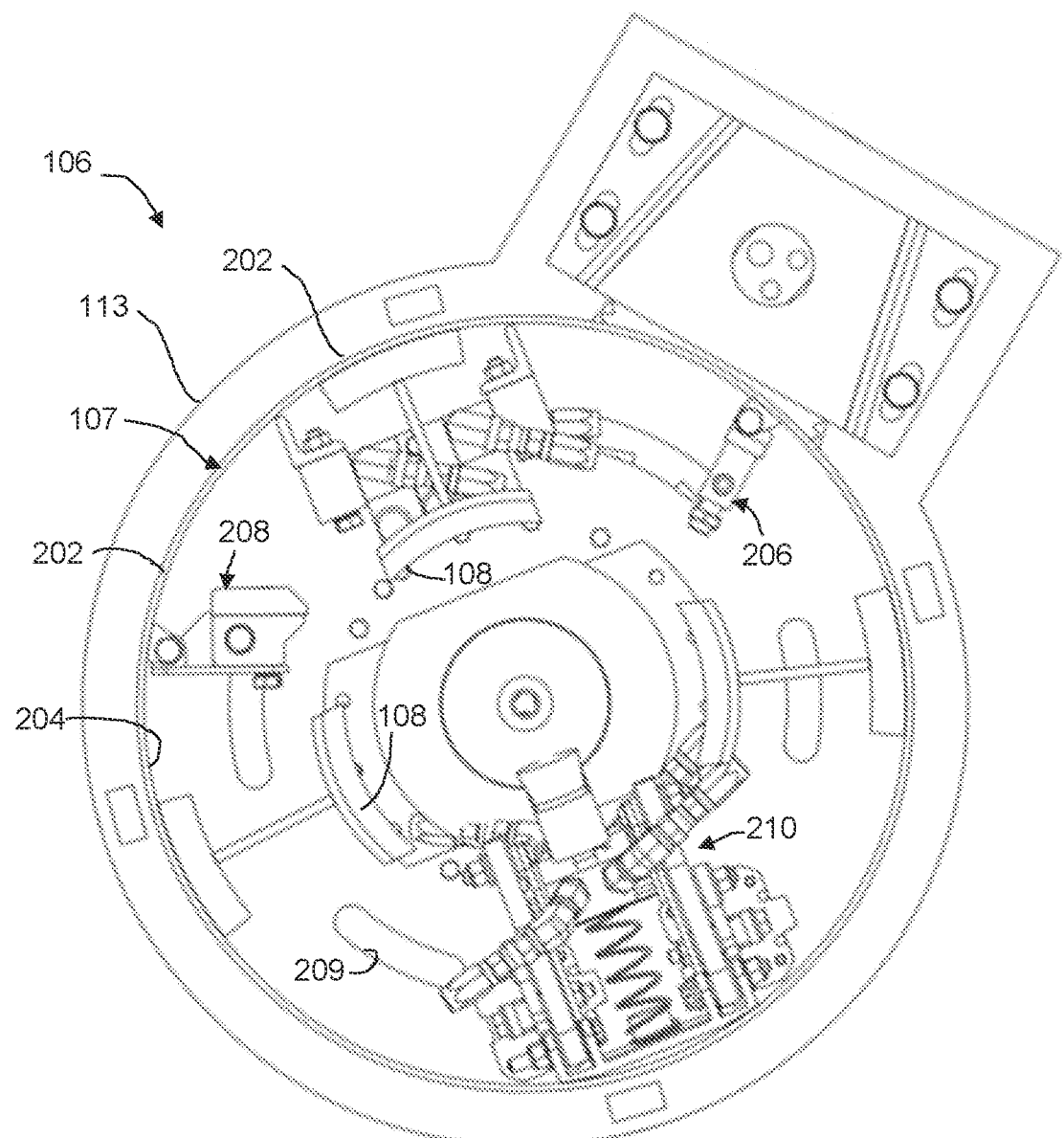
FIG. 2 is a top view of part of a pipe doping apparatus consistent with embodiments of the present disclosure.

Referring now to FIGS. 1-2, rotating bucket 107 of rotating bucket assembly 106 includes a bucket wall 202 with an inner surface 204, an open top 114, and plurality of drain holes 209 that are fluidly connected to a drain 130 (FIG. 1) for drainage of residual cleaning fluid and lubricant. In certain embodiments, rotating bucket assembly 106 may include a rotation sensor (not shown) for determining whether rotating bucket assembly 106 is rotating relative to base 102. As best shown in FIG. 2, rotating bucket assembly 106 may include one or more guides 108 to protect the bucket internals from inadvertent impact with the tubular. If desired, an additional guide, not shown, may be provided inside the bucket. The additional guide may be coaxial with the bucket and may be conical or frustoconical, so that the tubular slides over the additional guide as it enters the bucket and may be guided by the additional guide to a desired position within the bucket. As described below, rotating bucket 107 may contain a plurality of sub-assemblies including a cleaning unit 206, a drying unit 208, and a lubricating unit 210, each of which may be mounted on the floor or inside wall of bucket 107 so as to rotate with rotating bucket 107.

Figure 3:
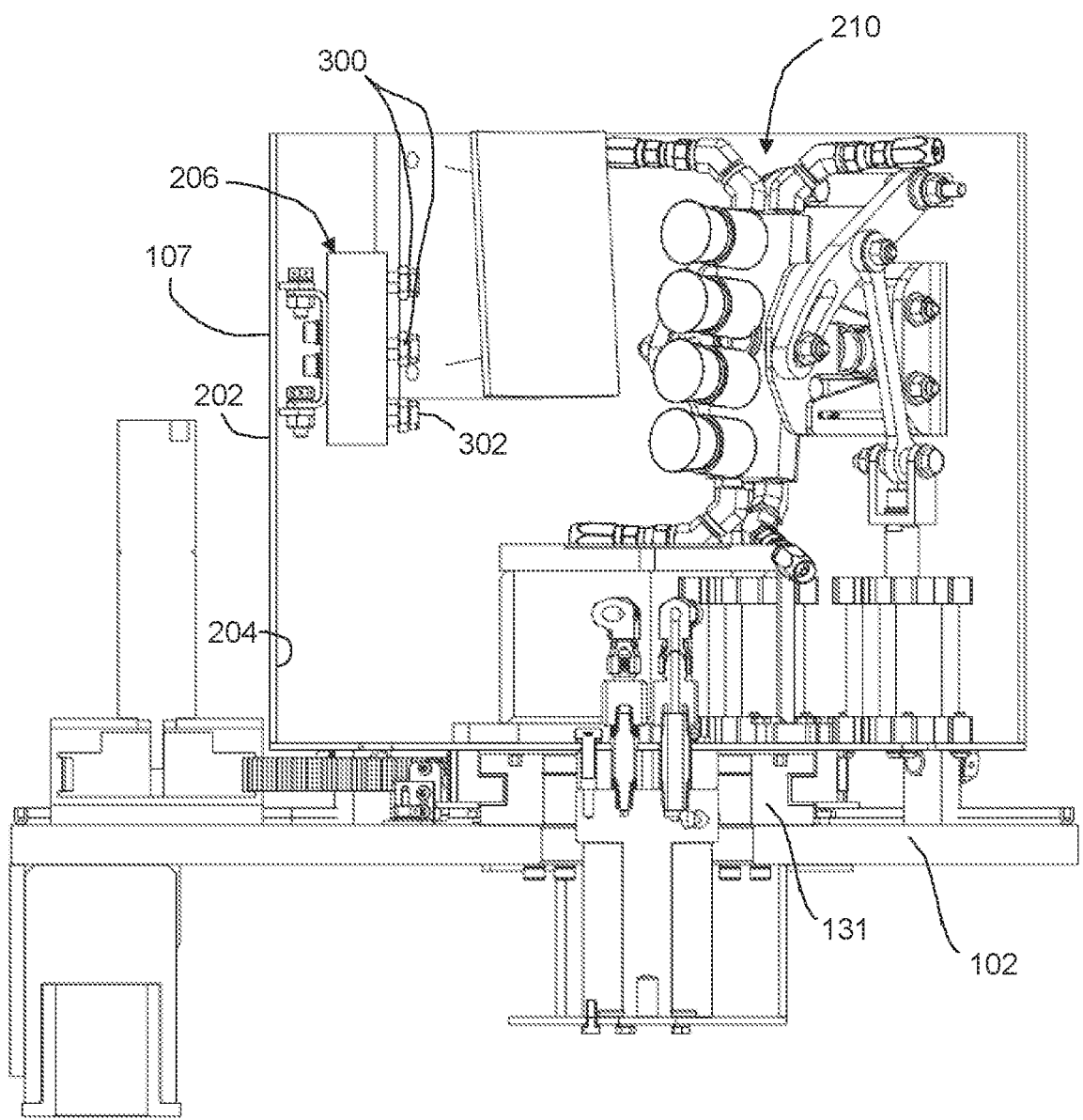
FIG. 3 is a cutaway side view showing a cleaning unit of a pipe doping apparatus consistent with embodiments of the present disclosure.

Referring now to FIG. 3, cleaning unit 206 may include one or more high pressure fluid jets 300 that are in fluid communication with fluid reservoir 116 and cleaning fluid pump 124. In embodiments in which cleaning unit 206 includes a plurality of high pressure fluid jets 300, high pressure fluid jets 300 may be arranged around the circumference of bucket wall inner surface 204, vertically along bucket wall inner surface 204 (as shown), or otherwise as desired. Each high pressure fluid jet 300 may include a high pressure nozzle 302. It will be understood that while cleaning unit 206 is shown wholly within bucket 107, cleaning unit 206 may alternatively be mounted wholly or partially outside of bucket 107, with jets 300 extending through bucket wall 202 and with nozzles 302 positioned at a desired location within bucket 107.

Figure 4:
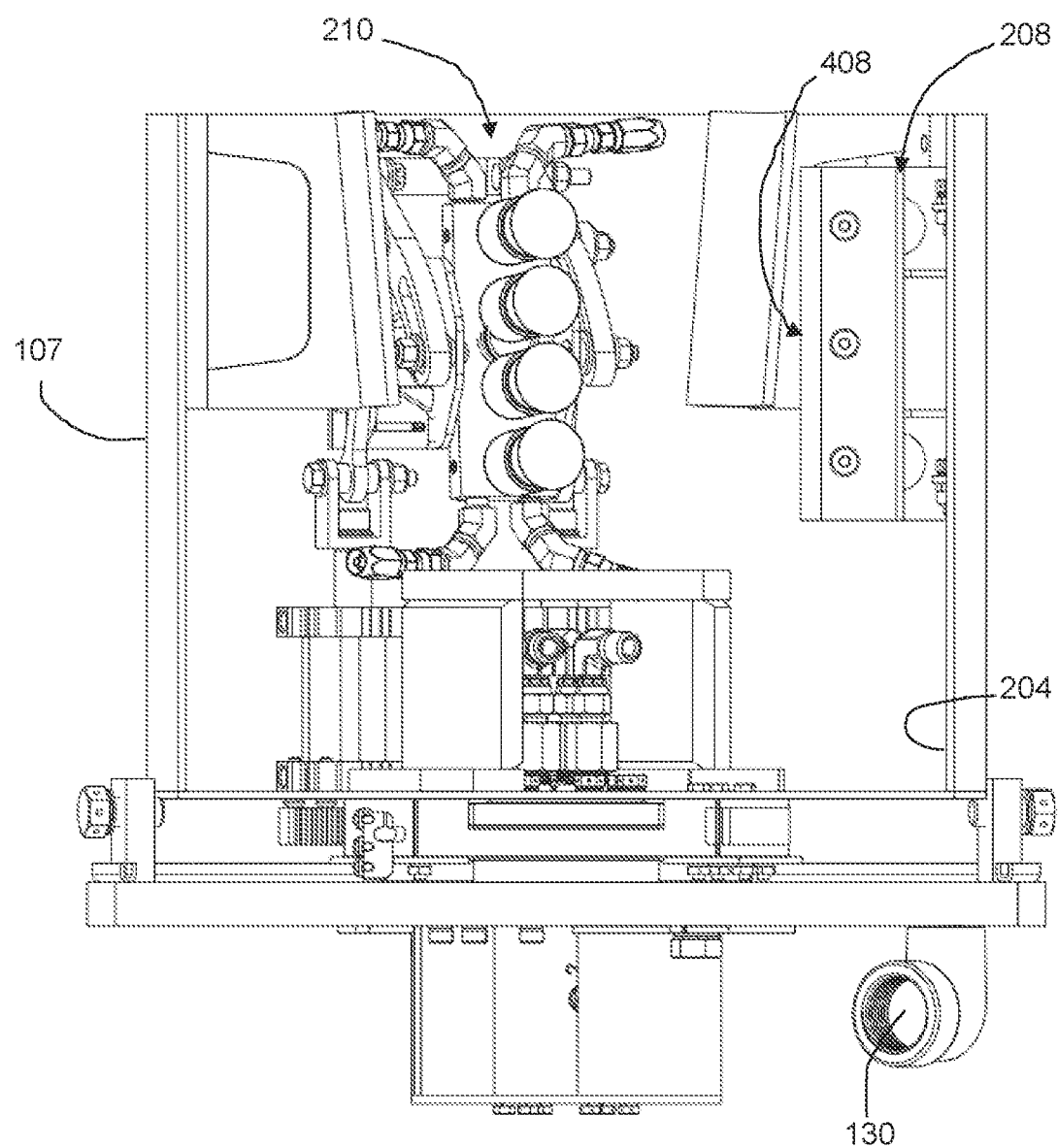
FIG. 4 is an enlarged side view showing a drying unit of a pipe doping apparatus consistent with embodiments of the present disclosure.

Referring now to FIG. 4, drying unit 208 may include one or more air outlets 408 that are in fluid communication with drying gas reservoir 410. In certain embodiments, drying unit 208 may be a high pressure air dryer. In some embodiments, air outlet 408 may be configured to provide an "air blade" or "air knife." In other embodiments, air outlet 408 may comprise an array of air nozzles. Air outlet 408 may deliver pressurized air to the surface of pin end 112, which may serve to dry pin end 112. Drying gas pump 404 (FIG. 1) may be a blower or air compressor.

Figure 5:
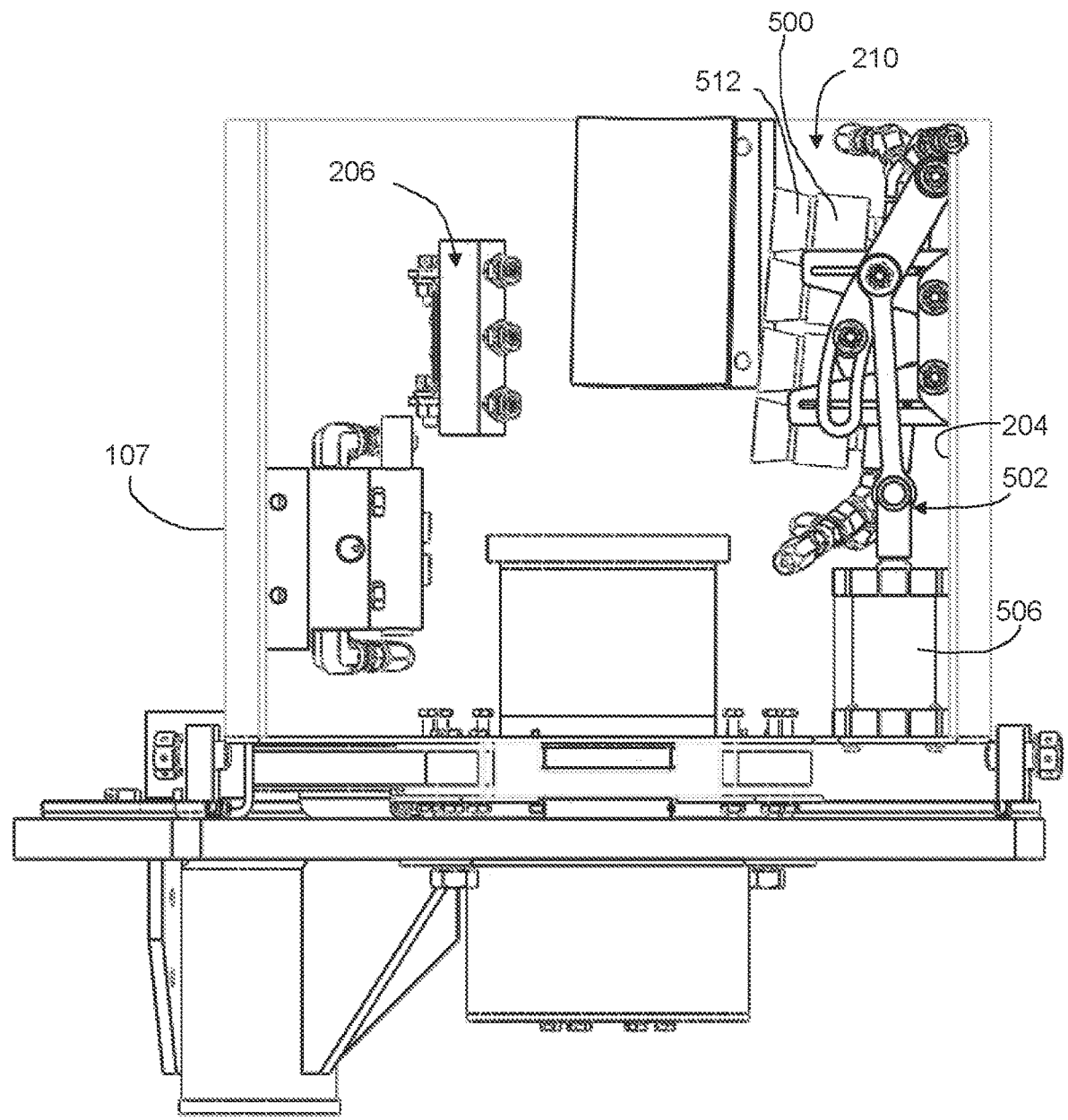
FIGS. 5 and 6 are each a cutaway view of a lubricating unit of a pipe doping apparatus consistent with elements of one embodiment of the present disclosure in a retracted and extended position, respectively.
Figure 6:
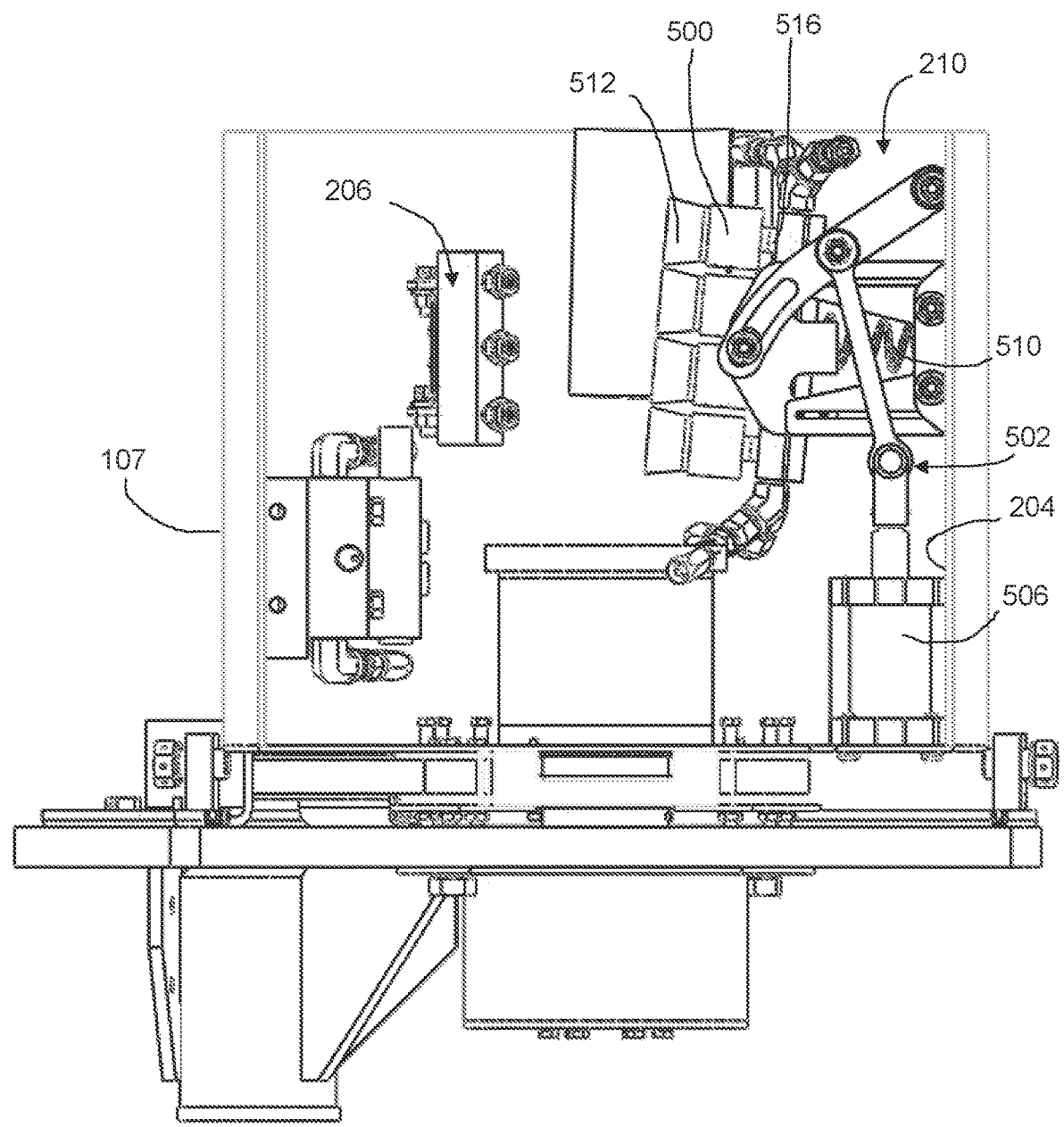

Referring now to FIGS. 5 and 6, lubricating unit 210 may include one or more retractable lubricant applicators 500 that are in fluid communication with lubricant reservoir 118 and lubricant pump 119 via line 122c and a fluid passageway (not shown) that extends through each lubricating unit. One or more retractable lubricant applicators 500 may each include an applicator head 512 extending therefrom. Each retractable lubricant applicator 500 may be, for example and without limitation, a spatula-type applicator, a mop-type brush, a bristle brush, a foam brush, a roller brush, or any other device suitable for applying pipe dope. One or more lubricant applicator 500 may be formed from a durable material that is generally nonreactive to the chemicals in the pipe dope and other fluids typically encountered during operations. In some embodiments, lubricant may be delivered to each applicator head 512 through a grease passage 516 (FIG. 6).

In embodiments in which there are multiple retractable lubricant applicators 500, the brush heads may be arranged so that their configuration corresponds to the taper of pin end 112.

Lubricating unit 210 may also include one or more pneumatic actuation system 502. Pneumatic actuation system 502 may include a pneumatic cylinder 506 defining a chamber, a piston (not shown) received in the chamber, and, optionally, a spring 510. Retractable lubricant applicators 500 may be mechanically coupled to the piston of pneumatic cylinder 506 such that when the chamber of pneumatic cylinder 506 is filled with pressurized air, spring 510 is compressed, thereby shifting applicator heads 512 toward bucket wall inner surface 204 and out of contact with pin end 112. When pneumatic cylinder 506 is vented or pressurized on its other side, spring 510 extends (if present), the piston is pushed back through pneumatic cylinder 506, thereby shifting applicator heads 512 away from bucket wall 202 and toward pin end 112 of tubular 110. Thus, lubricant applicators 500 can be controllably retracted by selectively pressurizing pneumatic actuation system 502.

Lubricant applicators 500 need not be co-supported. In alternative embodiments, a separate pneumatic actuation system 502 may be provided for each retractable lubricant applicator 500. In some embodiments, each of retractable lubricant applicators 500 may be coupled to a divider valve assembly that controllably divides flow of lubricant among retractable lubricant applicators 500 and/or between multiple lubricating units 210.

In some embodiments, lubricating unit 210 includes a centripetal actuation system that uses the inertia of the rotating components to move retractable lubricant applicators 500 from a retracted to an extended position. By way of example, a lubricant applicator may be pivotably mounted and a relatively heavier weight may be mechanically coupled thereto such that when lubricating unit 210 rotates around the bucket axis, the weight will tend to move outward, away from the bucket axis, causing the lubricant applicator to move toward the bucket axis. In some instances, the lubricant applicator or lubricant thereon may move far enough toward the bucket axis as to come into contact with the end of a tubular in the bucket. If desired, the applicator may be designed such that friction may slow rotation of the lubricating unit relative to the pipe, allowing the weight to return to its original position and causing the lubricant applicator to retract.

Referring again to FIG. 1, in certain embodiments, pipe doping apparatus 100 may include a rotary actuator 104 mechanically connected between base 102 and rotating bucket assembly 106. Rotary actuator 104 is configured to rotate rotating bucket assembly 106 about the center axis of rotating bucket 107 relative to base 102. Rotary actuator 104 may be any mechanism for providing a rotational force, or torque. By way of example, rotary actuator 104 may be a motor and may be driven by any suitable means, including hydraulic, electric, or pneumatic power sources. Rotary actuator 104 may drive bucket 107 directly or by means of gears, belts, or other power transmission means. In some alternative embodiments, bucket 107 may not rotate relative to the base and instead one or more of the sub-assemblies including cleaning unit 206, drying unit 208, and lubricating unit 210 may rotate relative to the bucket and/or the pipe. In these embodiments, bucket 107 may or may not rotate.

Alternatively or in addition, rotation of one or more components relative to pipe 110 may be driven by fluid momentum change from air or water jets. By way of example, at least one of the cleaning unit and the drying unit may include outlet jets that are oriented other than directly at the tool axis, such that flow of fluid through the outlet jets imparts a torque or rotational force to the jet and its support. If unit is able to rotate with respect to the base, this force will cause it to rotate. In still other embodiments, the rotary actuator may be mechanically connected between base 102 and a positioning assembly such as is described below, between bucket assembly 106 and a positioning assembly, or between one or more of the sub-assemblies and a positioning assembly.

In some embodiments, a slewing bearing 131 (FIG. 3) mechanically couples rotating bucket assembly 106 to base 102. A rotary coupling 111 enables fluid communication between rotating bucket assembly 106 and base 102. Rotary coupling 111 supplies cleaning fluid, drying fluid, and lubricant from lines 122a-c to cleaning unit 206, drying unit 208, and a lubricating unit 210, respectively. Rotary coupling 111 may include a stationary rotator coupling affixed to base 102 and a rotating rotator coupling affixed to rotating bucket assembly 106. Rotating bucket assembly 106 may be positioned on top of base 102.

Figure 7:
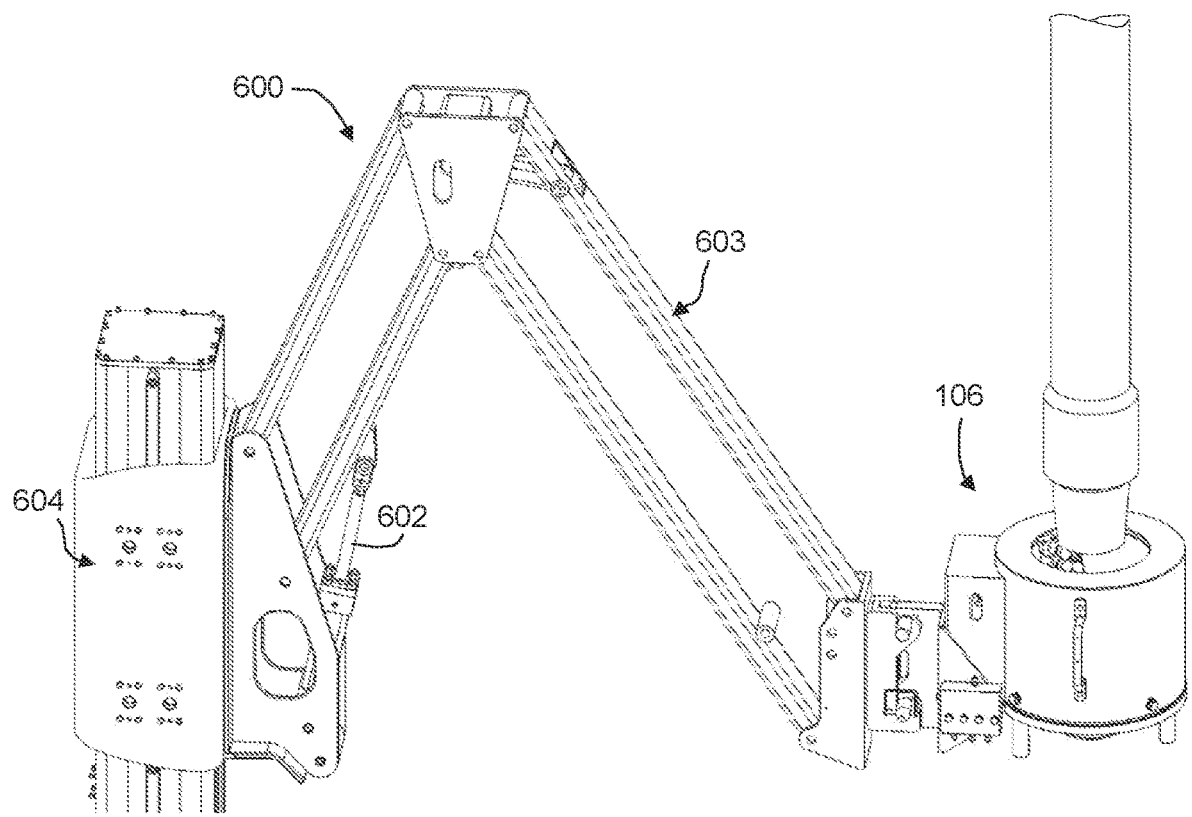
FIG. 7 is a perspective view of a positioning assembly of a pipe doping apparatus consistent with embodiments of the present disclosure.

In certain embodiments, pipe doping apparatus 100 may be positioned relative to pipe 110 using a positioning assembly 600, illustrated in FIG. 7. Positioning assembly 600 may include a hinged arm assembly 603, a support frame 604, and at least one positioning actuator 602 configured to move hinged arm assembly 603 relative to support frame 604. In some embodiments, arm assembly 603 and frame 604 can each extend and retract, with support frame 604 providing vertical movement and arm assembly 603 providing lateral movement. In some embodiments, there may be one positioning actuator to provide vertical motion of frame 604 and a second positioning actuator to provide lateral movement and or rotation of arm assembly 603. Movement of either arm assembly 603 and/or frame 604 causes rotating bucket assembly 106 to move. Frame 604 may be mechanically coupled to any stationary part of a drilling rig. Each positioning actuator may comprise a hydraulic, pneumatic, or electric actuator and may be rotary or linear in form.

Figure 8:
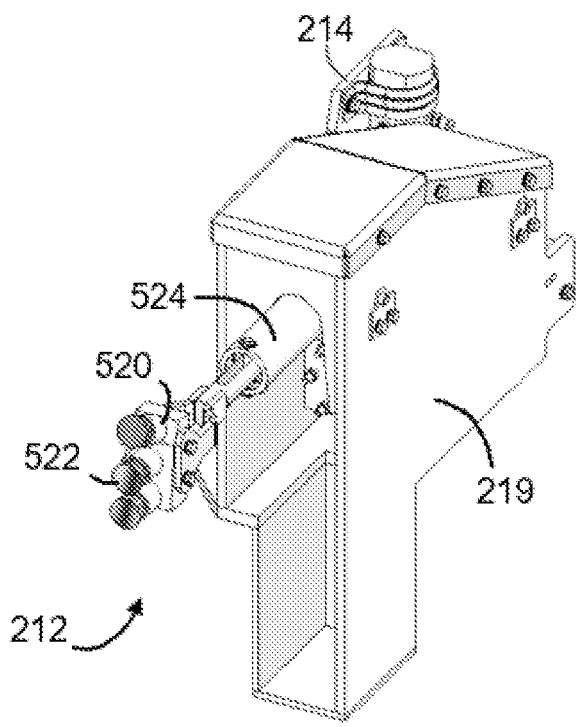
FIGS. 8 and 9 are perspective and side views, respectively, of an additional component of a pipe doping apparatus consistent with embodiments of the present disclosure.

In certain embodiments, an additional lubricating unit 212 may be included in pipe doping system 100. As shown in FIG. 8, additional lubricating unit 212 may include a housing 219 and one or more lubricant applicators 520 that may be in fluid communication with lubricant reservoir 118 and lubricant pump 119 (FIG. 1). Lubricant applicators 520 may each include an applicator head 522 extending therefrom. Like retractable lubricant applicators 500, each lubricant applicator 520 may be, for example and without limitation, a spatula-type applicator, a mop-type brush, a bristle brush, a foam brush, a roller brush, or any other device suitable for applying pipe dope and may be formed from a durable material that is generally nonreactive to the chemicals in the pipe dope and other fluids typically encountered during operations. If desired, lubricant applicators 520 may be supported on one or more telescoping arm 524 that allows the lubricant applicator(s) to be retracted into housing 219.

Figure 9:
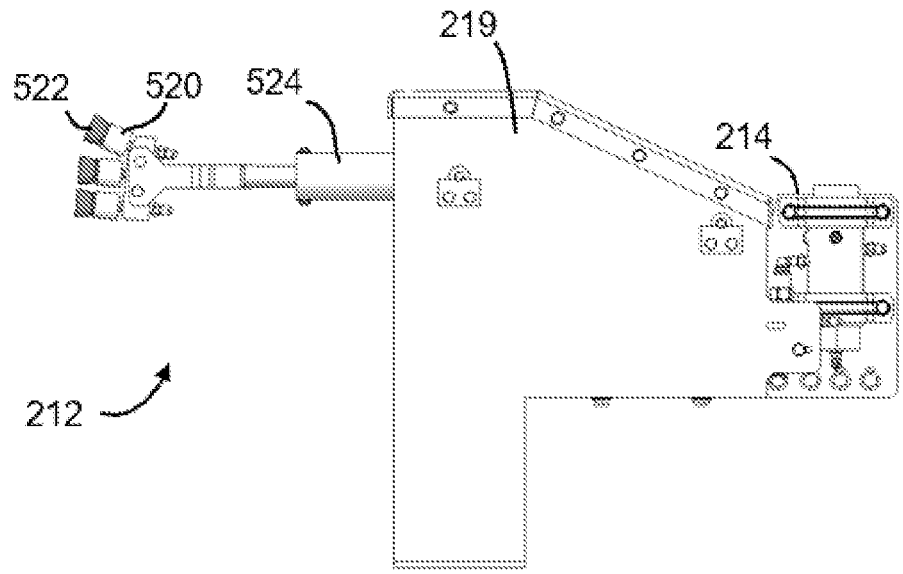
Figure 10:
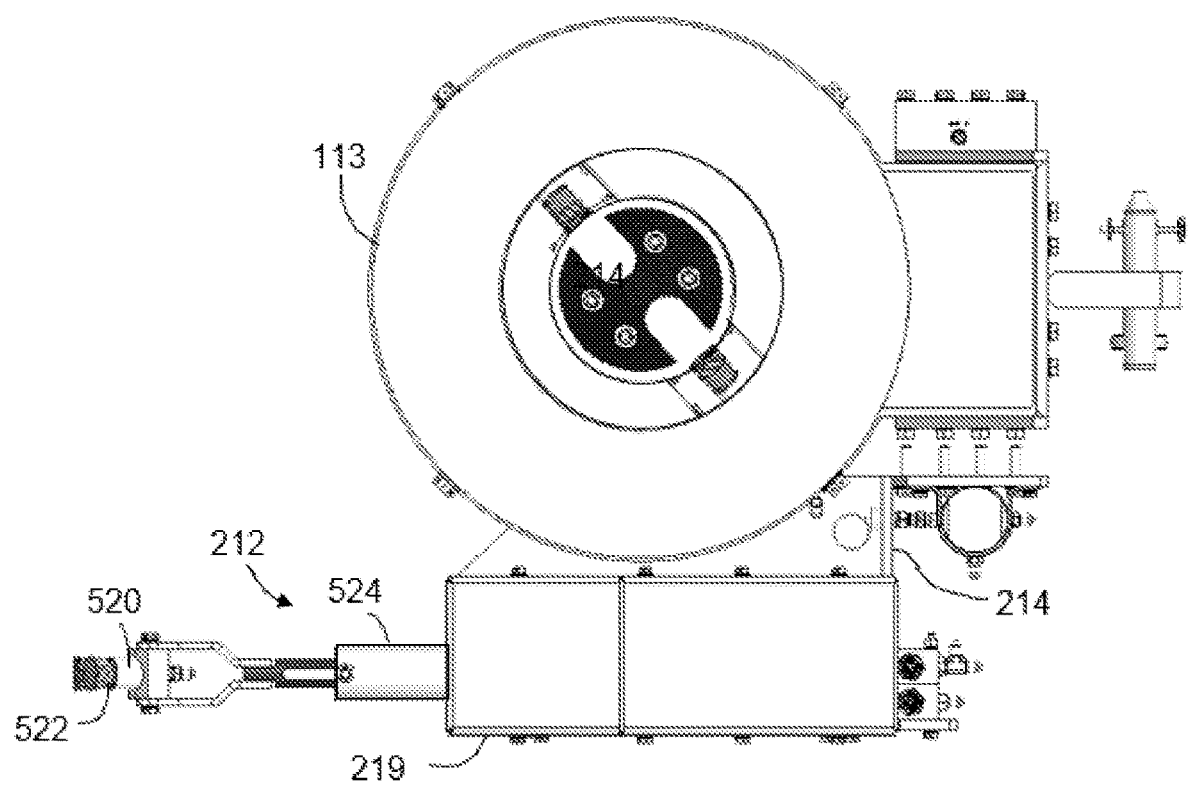
FIG. 10 is a top view of the additional component of FIGS. 8 and 9 mounted on a pipe doping apparatus according to one embodiment of the present disclosure.

Additional lubricating unit 212 may be mounted on rotating bucket 107, on base 102, on positioning assembly 600, or may be mounted on an additional or separate positioning assembly (not shown) that is itself mounted on rotating bucket 107, on base 102, on positioning assembly 600. By way of example only, as illustrated in FIGS. 8-10, additional lubricating unit 212 may include a mounting bracket 214 that can be attached to bucket guard 113 (FIG. 1).

Additional lubricating unit 212 may be configured to apply lubricant to the pin end of a top drive assembly. The pin of a top drive tends to be less accessible than a tubular pin end and the components of additional lubricating unit 212 may be sized to fit between or around obstacles so as to position lubricant applicators 520 close enough to apply lubricant to the top drive pin. The position and operation of rotation of additional lubricating unit 212 may be controlled by controller 128.

As indicated by the directional arrows in FIG. 1, in some embodiments, it may be desired to move the rotating bucket assembly 106 toward the pin end 112, in some embodiments it may be desired to move the pin end 112 into the rotating bucket assembly 106, and in some embodiments it may be desired to move both pin end 112 and rotating bucket assembly 106 jointly. Further, it will be understood that neither pin end 112 nor rotating bucket assembly 106 need be oriented as illustrated: by way of example, each could have a horizontal rather than a vertical axis. Optionally, one or more sensors (not shown) may be configured to sense when tubular 110 is in the desired position within bucket 107 and to communicate that information to controller 128.

Still further, a sensor (not shown) may be used to actuate a cleaning, drying, and doping cycle when a tubular has reached a suitable position within bucket 107. The sensor may be a mechanical (pressure) sensor, acoustic sensor, photo-sensor, or other suitable sensor capable of detecting the presence or location of pin end 112 and transmitting an actuation signal to controller 128.

In certain embodiments, the flow of one or more of cleaning fluid, air, and lubricant may be controlled by one or more control valves. In some embodiments, as shown in FIG. 1, flow from cleaning fluid reservoir 116 is controlled by control valve 117a, flow of air from drying gas reservoir 410 is controlled by control valve 117b, and flow of lubricant from lubricant reservoir 118 is controlled by control valve 117c. Control valves 117a-c may each be actuated by controller 128, which is in data communication with control valves 117a-c. In some embodiments, the flow of one or more of cleaning fluid, air, and lubricant may be controlled by the selective actuation of cleaning fluid pump 124, drying gas pump 404, and lubricant pump 119 respectively. In some such embodiments, fluid pump 124, drying gas pump 404, and lubricant pump 119 may also be controlled by controller 128.

Referring again to FIG. 1, fluid reservoir 116 may hold a cleaning fluid for use in cleaning unit 206. In a non-limiting example, the cleaning fluid is water. Fluid in fluid reservoir 116 may be transferred to pipe doping assembly 100 via cleaning fluid pump 124.

Drying gas reservoir 410 may hold drying gas for use in drying unit 208. In a non-limiting example, the drying gas is air. Gas in drying gas reservoir 410 may be transferred to pipe doping assembly 100 via drying gas pump 404.

Lubricant reservoir 118 may hold lubricant fluid for use in lubricating unit 210. Lubricant fluid may be pipe dope, grease, or any lubricating material for sealing and lubricating a tubular connection, herein referred to generally as "lubricant." In some embodiments, the lubricant may be selected based on one or more desired material properties including but not limited to consistency, viscosity, and wetting properties. Lubricant from lubricant reservoir 118 may be transferred to pipe doping assembly 100 via lubricant pump 119.

Operation

In an exemplary method of operation, when present, positioning assembly 600 may position pipe doping apparatus 100 for cleaning and lubricating pin end 112 of tubular 110. Such positioning may include positioning rotating bucket 107 such that pin end 112 of tubular 110 is received in rotating bucket 107 through open top 114. Optional sensors may sense when tubular 110 is in the desired position within bucket 107 and communicate that information to controller 128. Once pin end 112 of tubular 110 is received in rotating bucket 107, rotating bucket 107 and/or the components therein may be rotated using rotary actuator 104. Rotation of rotating bucket 107 may be continuous or intermittent while pin end 112 of tubular 110 is within rotating bucket 107. Tubular 110 may remain stationary. The rate and duration of rotation of rotating bucket 107 may be controlled by controller 128.

Cleaning fluid may be pumped using fluid pump 124 from fluid reservoir 116. When present, control valve 117a may be opened to allow cleaning fluid to flow through to rotary coupling 111 to one or more high pressure nozzles 302 via one or more cleaning fluid supply lines 122a. Cleaning unit 206 may clean pin end 112 of tubular 110 by spraying pressurized cleaning fluid onto tubular pin end 112. Cleaning unit 206 may rotate around tubular 110 as rotating bucket assembly 106 rotates, thereby cleaning the entire circumference of pin end 112. Cleaning unit 206 may deliver a predetermined amount of cleaning fluid to pin end 112 or operate for a predetermined period of time. Upon completion of a cleaning cycle, controller 128 may close control valve 117a (if present) and fluid pump 124 may cease operation. Residual cleaning fluid may drain from rotating bucket assembly 106 through drain 130.

After the cleaning cycle is complete, drying unit 208 may be activated by controller 128 to dry pin end 112 prior to lubricant application. Controller 128 may open control valve 117b, allowing pressurized air or other drying fluid to enter rotating bucket assembly 106 through rotary coupling 111. Drying unit 208 may remove cleaning fluid from pin end 112 by delivering pressurized air to surface of pin end 112. Drying unit 208 may rotate around tubular 110 as rotating bucket assembly 106 rotates, thereby drying the entire circumference of pin end 112. Drying unit 208 may operate for a predetermined amount of time or deliver a predetermined amount of air to pin end 112. After completion of the drying operation, controller 128 may close control valve 117b (if present).

After the drying operation is completed, lubricating units 210 may engage pin end 112. Pneumatic actuator 502 may extend one or more retractable lubricant applicators 500 from a retracted position to an extended position, as described above. Lubricant may be pumped by lubricant pump 119 from lubricant reservoir 118 through control valve 117c (if present) and rotary coupling 111 to the divider valve assembly (if present). The divider valve assembly may deliver a metered volume of lubricant to one or more retractable lubricant applicators 500. Each applicator head 512 applies lubricant to the surface of pin end 112 of tubular 110. Lubricating units 210 may rotate around tubular 110 as rotating bucket assembly 106 rotates thereby lubricating the entire circumference of pin end 112. Lubricating unit 210 may operate for a predetermined amount of time or deliver a predetermined amount of lubricant to pin end 112.

After completion of the lubricating operation, pneumatic actuator 502 may retract one or more retractable lubricant applicators 500 from an extended position to a retracted position, as described above. Controller 128 may close control valve 117c and lubricant pump 119 may cease operation. Controller 128 may then cease rotation of rotating bucket assembly 106. Residual lubricant may exit rotating bucket 107 through drain 130.

In other embodiments, the flow of fluid from the cleaning and/or drying unit may be sufficient to cause rotation of the components of the device relative to the pipe. In still further embodiments, rotation of the lubricating unit may be sufficient to actuate retractable lubricant applicators 500 from a retracted position to an extended position and cessation of rotation may allow them to fall back to a retracted position.

In some embodiments, the system may include one or more sensors for sensing the amount and distribution of cleaning fluid, drying fluid and lubricating compound applied to tubular 110.

Upon completion of lubrication of tubular 110, positioning assembly 600 may lower rotating bucket assembly 106, thereby removing and/or disengaging rotating bucket assembly from tubular 110. In some embodiments, the entire process takes place while the auto-doper system is rotating. If power is lost, the controller and control valves may fail to a safe mode where no water, air, or lubrication is supplied or pumped.

In some embodiments, additional lubricating unit 212 may be used to apply lubricant to a top drive pin as part of tripping operations in which the top drive assembles or disassembles the joints of a drill string.

The present automatic pipe doping system reduces or eliminates the need for rig personnel to be present on the rig floor, thereby removing them from a safety-intensive zone. Because bucket 107 rotates about the drill pipe connection, it is relatively easy for a pipe handling machine to insert a tubular for the cleaning and lubrication. The lubricant applicators in the present invention can be selected to apply lubricating compound to the pipe threads in the conventional manner or in another desired mode, thereby achieving a desired result. For example, if the conventional-style brushes are selected, the same even distribution of lubrication compound will result as with the current manual method. Alternatively, a special pattern of brushes could be selected to provide a specific lubricant pattern on the pipe. Similarly, the amount of cleaning fluid, drying fluid, and lubricant applied to tubular 110 may be adjusted on the fly by controller 128 so as to respond to varying conditions.

The present automatic pipe doping system may also reduce or eliminate the need for motors to move the various components of the system in order to accomplish the desired steps. By way of example, rotation of the components may be caused by fluid jets and actuation of the lubricant applicator(s) may be caused by centripetal action. By eliminating unneeded motors, the present system can be safer and less likely to fail.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A method of applying lubrication to an end of a tubular, the method comprising:
    a) providing a pipe doping apparatus, the pipe doping apparatus comprising:
        a bucket assembly, the bucket assembly including a base and a bucket supported on the base and having an inside volume;
        a lubricating unit, the lubricating unit having at least one extendable and retractable lubricant applicator inside the bucket;
        a cleaning unit having at least one cleaning fluid outlet inside the bucket;
        a drying unit having at least one drying fluid outlet inside the bucket;
        wherein at least one of the cleaning unit and the drying unit includes an outlet jet oriented other than directly at the tool axis, such that flow of fluid through the outlet jet imparts a resulting torque to the jet and its support, and wherein the resulting torque causes at least one of the bucket and the lubricating unit to rotate relative to the base;
        at least one sensor indicating a position of a pipe within the bucket;
        a positioning assembly supporting the base and the bucket assembly; and
        an additional lubricating unit mounted on one of the bucket, the base, or the positioning assembly;
    b) positioning an end of the tubular within the bucket assembly;

c) lubricating an end of the tubular while a pin end of the tubular is within the bucket assembly; and d) removing an end of the tubular from the rotating bucket assembly.

2. The method of claim 1 wherein step b) comprises using the positioning assembly to move the rotary bucket assembly such that the pin end of the tubular is received in the bucket.

3. The method of claim 2 wherein step c) includes rotating at least one of the bucket, the cleaning unit, the drying unit, and the lubricating unit relative to the tubular.

4. The method of claim 2 wherein step c) further includes:
1 c1) cleaning the pin end of the tubular by supplying cleaning fluid through an outlet;

c2) drying the pin end of the tubular by supplying drying fluid through an outlet; and c3) lubricating the pin end of the tubular by supplying lubricant through a lubricant applicator.

5. The method of claim 4 wherein step c3) includes advancing the retractable lubricant applicator toward an end of the tubular.

\* \* \* \* \*